(12) United States Patent
Collot et al.

(10) Patent No.: US 12,535,092 B2
(45) Date of Patent: Jan. 27, 2026

(54) REDUCED-MASS FLOATING-NUT SYSTEM AND METHOD FOR ASSEMBLING TWO PARTS USING SAID SYSTEM

(71) Applicant: Airbus Operations (S.A.S.), Toulouse (FR)

(72) Inventors: Emmanuel Collot, Toulouse (FR);
Frédéric Goupil, Toulouse (FR);
Ghislain Viauvy, Toulouse (FR);
Emma Abbouab, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 0 days.

(21) Appl. No.: 19/049,519

(22) Filed: Feb. 10, 2025

(65) Prior Publication Data

US 2025/0257751 A1 Aug. 14, 2025

(30) Foreign Application Priority Data

Feb. 12, 2024 (FR) ...................................... 2401342

(51) Int. Cl.
*F16B 5/02* (2006.01)
*F16B 29/00* (2006.01)
*F16B 37/04* (2006.01)

(52) U.S. Cl.
CPC ............ *F16B 5/0225* (2013.01); *F16B 29/00* (2013.01); *F16B 37/044* (2013.01)

(58) Field of Classification Search
CPC ....... F16B 5/0225; F16B 29/00; F16B 37/044
See application file for complete search history.

(56) References Cited

U.S. PATENT DOCUMENTS

| | | | | |
|---|---|---|---|---|
| 3,646,982 A | * | 3/1972 | Cushman | F16B 37/14 411/965 |
| 3,783,922 A | * | 1/1974 | Petrus | F16B 37/044 411/111 |
| 4,250,732 A | * | 2/1981 | Moryl | F16B 37/044 72/370.07 |
| 8,568,073 B2 | * | 10/2013 | Eberle | B60R 13/0206 411/526 |
| 9,353,779 B2 | * | 5/2016 | Hendrix | F16B 5/025 |
| 11,698,093 B2 | * | 7/2023 | Heinrichs | F16B 19/1072 411/15 |
| 2008/0253859 A1 | * | 10/2008 | Johnson | F16B 37/044 411/103 |

FOREIGN PATENT DOCUMENTS

EP 3724520 B1 8/2021
KR 20180022609 A 3/2018

* cited by examiner

*Primary Examiner* — Michael P Ferguson
(74) *Attorney, Agent, or Firm* — KDW Firm PLLC

(57) ABSTRACT

A floating-nut system for assembling a part and a part, the part including an opening having an axis of revolution, the floating-nut system including at least one elastomer cage device and a nut device, the cage device including a cylinder to be introduced into an opening made in the part and a collar around the cylinder. The nut device includes a cylinder having an axis of revolution and a washer to press the collar against the part when the screw is screwed into the cylinder. The cylinder is deformable as the screw is screwed in so that the axis of revolution and the axis of revolution become substantially coincident. The elastomer cage device makes it possible to reduce the mass of the floating-nut system.

20 Claims, 3 Drawing Sheets

REDUCED-MASS FLOATING-NUT SYSTEM AND METHOD FOR ASSEMBLING TWO PARTS USING SAID SYSTEM

TECHNICAL FIELD

The disclosure herein relates to a reduced-mass floating-nut system and to a method for assembling two parts using the system.

BACKGROUND

When one part needs to be assembled with another part, there may be misalignments between the two parts as a result of assembly tolerances. The most commonplace way of accommodating this misalignment is to use a floating nut, made up of a metal nut held captive in a metal cage. Prior to assembly, this metal cage may be installed, using operation such as cold expansion, in a hole in one of the parts or by riveting it to one of the parts.

This type of floating nut therefore calls upon tricky operations in order to install it. When the number of floating nuts is great, the installation time may be long and the operations tricky. For example, approximately four thousand floating nuts may be installed in the case of a ventral fairing of an aircraft.

This collection of floating nuts therefore represents a very significant mass.

SUMMARY

It is an object of the disclosure herein to disclose a reduced-mass floating-nut system for assembling two parts that are to be assembled.

To that end, the disclosure herein relates to a floating-nut system intended for assembling a first part and a second part, the first part comprising a first opening intended for the passage of a screw, the first opening having a first axis of revolution.

According to the disclosure herein, the floating-nut system comprises at least one elastomer cage device and a nut device, the cage device comprising:
  a first hollow cylinder having a second axis of revolution and an outside diameter substantially equal to a diameter of a second opening made in the second part, the first cylinder being intended to be introduced into the second opening via a first end of the first cylinder,
  a first collar projecting around a second end of the first cylinder on the external surface of the first cylinder, the first collar having a diameter intended to be greater than the diameter of the second opening;
the nut device comprising:
  a second hollow cylinder having a third axis of revolution parallel to the second axis of revolution and an internal surface comprising a screw thread, the screw thread being intended to collaborate with the screw as the screw is screwed in,
  a washer secured to the second cylinder, the washer extending all the way around the second cylinder, the washer having a diameter intended to be greater than the diameter of the second opening, the washer being embedded in the first collar, the washer being intended to press the first collar against the second part when the screw is screwed into the screw thread;
the first cylinder being configured to deform as the screw is screwed in so that the first axis of revolution and the third axis of revolution become substantially coincident when a screw is screwed into the screw thread.

Thus, by virtue of the elastomer cage, the floating-nut system has a reduced mass while at the same time accommodating misalignment between the two parts that are to be assembled.

Furthermore, the cage device comprises a second collar projecting around the first end of the first cylinder on an external surface of the first cylinder, the second collar having a diameter configured to be greater than the diameter of the second opening, the second collar being elastically deformable so that, on the one hand, it bends against the first cylinder in order to pass through the second opening when a user forces the cage device to pass through the second opening parallel to the second axis of revolution and, on the other hand, it unbends after it has passed through the second opening, the second collar being intended to be clamped between the first part and the second part when the screw is screwed into the screw thread.

According to one embodiment, the second collar comprises a plurality of fins projecting around the first end of the first cylinder.

Advantageously, the external surface of the first cylinder has a plurality of mutually parallel longitudinal grooves, each of the grooves being positioned in line with each of the fins, each of the grooves being intended to house the fin in line with which a groove is positioned when the fin is bent so that the second collar can pass through the second opening when a user forces the cage device to pass through the second opening parallel to the second axis of revolution.

Moreover, the nut device comprises a conical portion secured to the second cylinder, the conical portion having the shape of a cone frustum having a small base connecting the conical portion to a first end of the second cylinder and a large base intended to face the first opening.

Furthermore, the floating-nut system comprises a ring having an axis of revolution coincident with the second axis of revolution, the ring being driven into the first cylinder, the ring having a thickness substantially intended to be equal to a thickness of the second part liable to be assembled with the first part by the floating-nut system, the ring being configured not to deform when the first cylinder deforms.

In addition, the first collar has a circular rim, the first collar having a cylindrical wall on the circular rim, the cylindrical wall having a free end intended to be pressed against the second part when the screw is screwed into the screw thread.

The disclosure herein also relates to a method for assembling a first part and a second part using a floating-nut system as specified hereinabove.

According to the disclosure herein, the method comprises the following steps:
  a step of introducing the first cylinder into the second opening via the first end of the first cylinder;
  a step of introducing a screw into the first opening;
  a first step of deforming the first cylinder in shear until the first axis of revolution and the third axis of revolution of the second cylinder are substantially coincident;
  a step of introducing the screw into the second cylinder;
  a step of screwing the screw into the screw thread of the internal surface of the second cylinder;
  a second step of deforming the first cylinder in compression until the washer is pressing the first collar against the second part.

In addition, the step of introducing the first cylinder comprises:
- a sub-step of bending of the second collar in elastic deformation against the first cylinder as it passes through the second opening;
- a sub-step of unbending of the second collar after the second collar has passed through the second opening.

Moreover, the first deformation step comprises:
- a sub-step of introducing the screw into the conical portion;
- a sub-step of deforming the first cylinder as the screw progressively enters the conical portion until the screw enters the second cylinder.

BRIEF DESCRIPTION OF THE DRAWINGS

The appended figures will make it easy to understand how the disclosure herein may be implemented. In these figures, identical reference signs denote similar elements.

DETAILED DESCRIPTION

Figure 1:
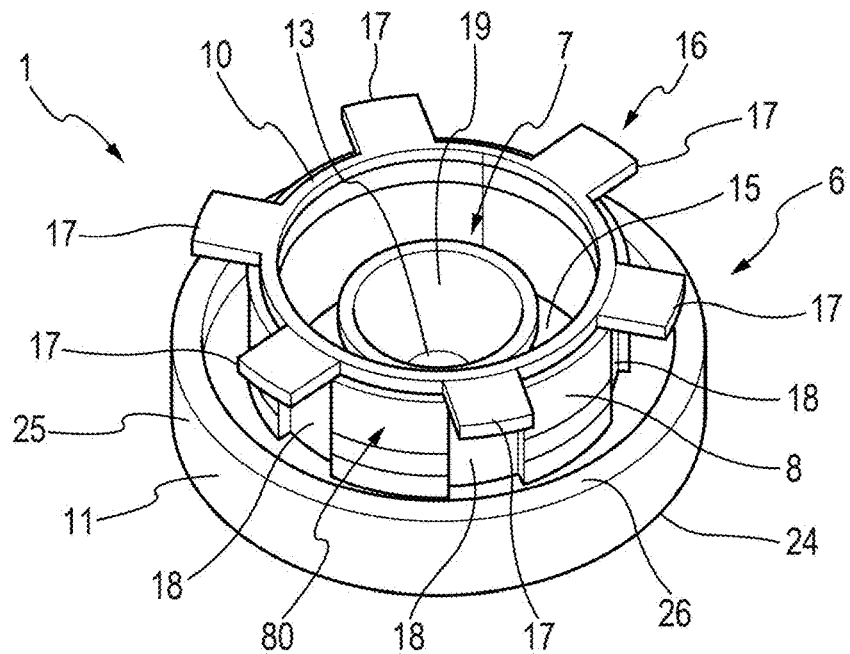
FIG. 1 depicts a perspective view of the floating-nut system.
Figure 2:
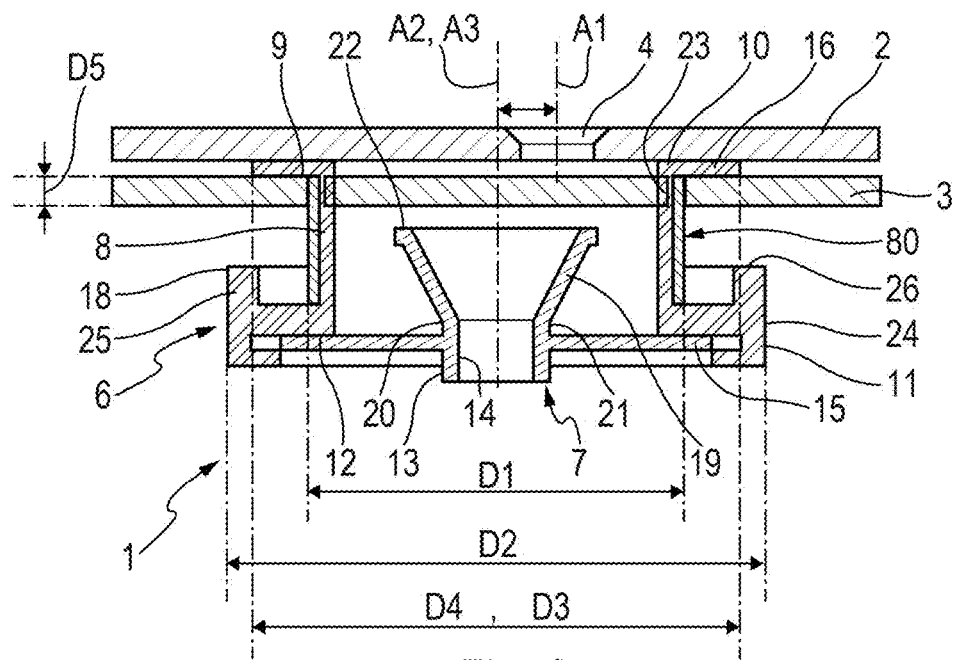
FIG. 2 depicts a diametral cross section through the floating-nut system and through two parts that are to be assembled.

FIG. 1 and FIG. 2 depict the floating-nut system 1 intended for assembling a first part 2 and a second part 3.

Nonlimitingly, the first part 2 and the second part 3 may each correspond to a metal plate that is to be assembled. The first part 2 and the second part 3 may also correspond to aircraft ventral fairings that are to be assembled.

The first part 2 comprises a first opening 4 intended for the passage of a screw 5. The first opening 4 has a first axis of revolution A1.

The first opening 4 may have been made by a tool in advance of the placement of the first part 2 with respect to the second part 3.

The floating-nut system 1 comprises at least one elastomer cage device 6 and a nut device 7. The cage device 6 holds the nut device 7 captive.

The cage device 6 comprises a first hollow cylinder 8. The first cylinder 8 has a second axis of revolution A2. The outside diameter D1 of the first cylinder 8 is substantially equal to a diameter of a second opening 9 made in the second part 3. Like the first opening 4, the second opening 9 may have been made by a tool in advance of the placement of the first part 2 with respect to the second part 3.

The first cylinder 8 is intended to be introduced into the second opening 9 via a first end 10 of the first cylinder 8.

The cage device 6 also comprises a first collar 11. The first collar 11 projects around a second end 12 of the first cylinder 8 on the external surface 80 of the first cylinder 8. The first collar 11 has a diameter D2 intended to be greater than the diameter of the second opening 9.

The nut device 7 comprises a second hollow cylinder 13 having a third axis of revolution A3 parallel to the second axis of revolution A2. The internal surface 14 of the second cylinder 13 comprises a screw thread. The screw thread is intended to collaborate with the screw 5 as the screw 5 is screwed into the screw thread.

The nut device 7 further comprises a washer 15 secured to the second cylinder 13. The washer 15 extends all the way around the second cylinder 13 or in other words the washer 15 projects around the second cylinder 13. The washer 15 has a diameter D3 intended to be greater than the diameter of the second opening 9. The washer 15 is embedded in the first collar 11. In addition to be embedded, additional fixing approaches may be provided such as overmolding, gluing or any other equivalent approach for fixing the washer to the collar. The washer 15 is intended to deform the first cylinder 8 by pressing the first collar 11 against the second part 3 when the screw 5 is screwed into the screw thread.

The first cylinder 8 is configured to deform as the screw 5 is screwed in so that the first axis of revolution A1 and the third axis of revolution A3 become substantially coincident when a screw 5 is screwed into the screw thread. Nonlimitingly, the configuration that enables the first cylinder 8 to be deformed may be dependent on the material from which the cage device 6 is manufactured and upon the wall thickness of the first cylinder 8.

The nut device 7 may be manufactured from a metallic material, such as stainless steel or aluminum.

Figure 5:
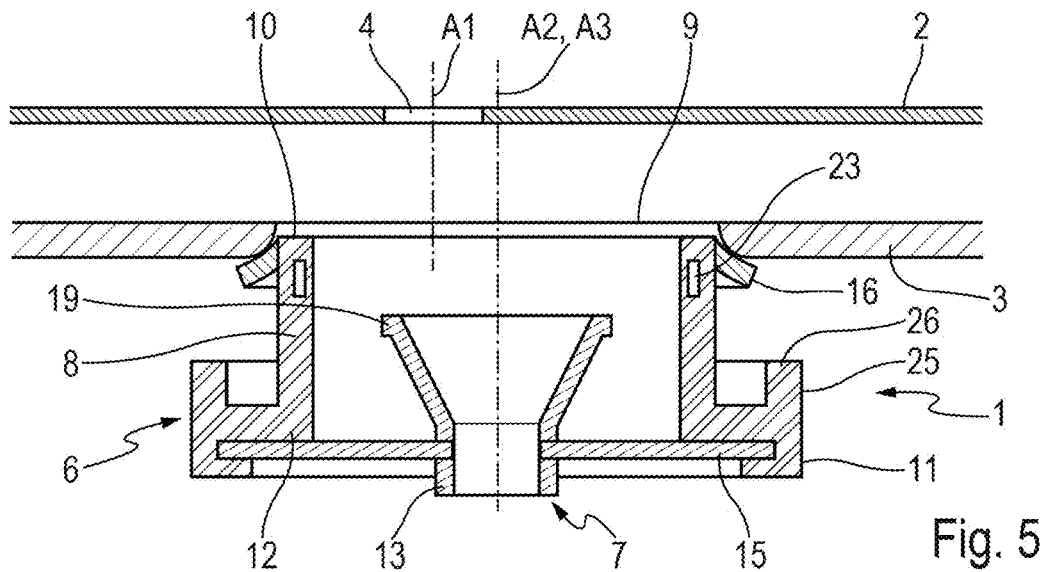
FIG. 5 depicts a diametral cross section through the floating-nut system and through the two parts that are to be assembled at the start of the introduction of the first cylinder into the second opening.
Figure 6:
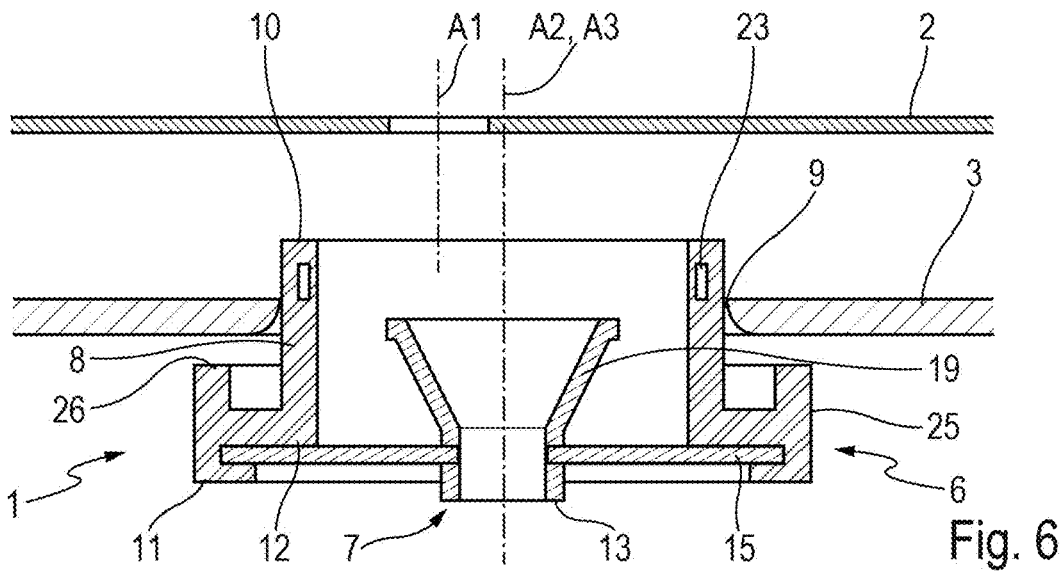
FIG. 6 depicts a diametral cross section through the floating-nut system and through the two parts that are to be assembled during the introduction of the first cylinder into the second opening.
Figure 7:
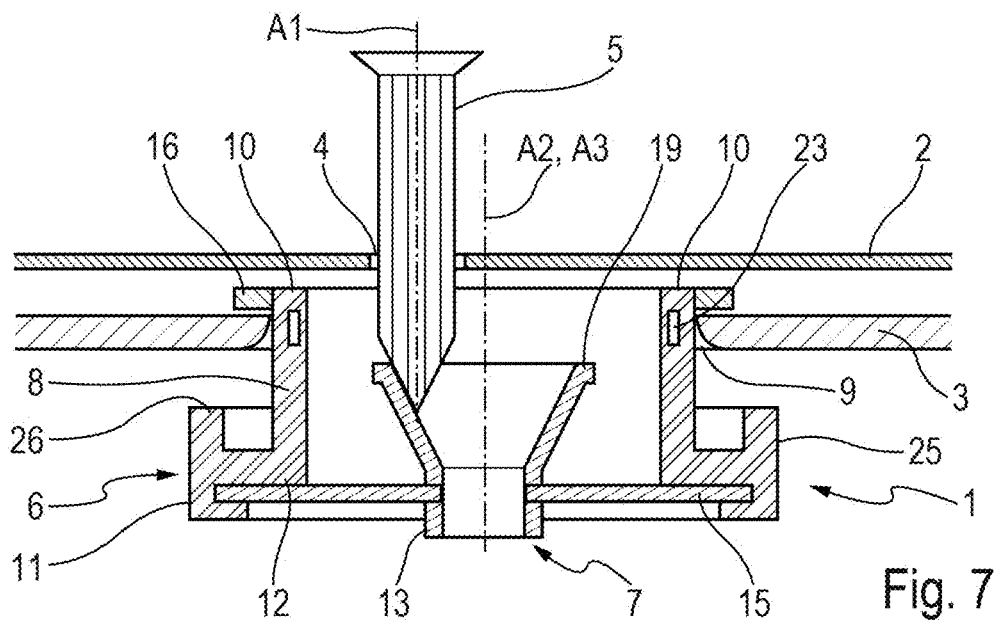
FIG. 7 depicts a diametral cross section through the floating-nut system, through the two parts that are to be assembled, and through a screw during the introduction of the screw into the first opening.

Advantageously, the cage device 6 further comprises a second collar 16 projecting around the first end 10 of the first cylinder 8 on an external surface 80 of the first cylinder 8. The second collar 16 has a diameter D4 configured to be greater than the diameter of the second opening 9. The second collar 16 is configured to be elastically deformable so that, on the one hand, it bends against the first cylinder 8 in order to pass through the second opening 9 when a user forces the cage device 6 to pass through the second opening 9 parallel to the second axis of revolution A2 (FIG. 5 and FIG. 6) and, on the other hand, it unbends after it has passed through the second opening 9 (FIG. 7).

The second collar 16 is intended to be clamped between the first part 2 and the second part 3 when the screw 5 is screwed into the screw thread.

The second collar 16 clamped between the first part 2 and the second part 3 enables the first cylinder 8 to be held in the second opening 9 during a method (described hereinafter) for assembling the first part 2 and the second part 3. Thus, the first cylinder 8 does not escape from the second opening 9 during the assembly method.

According to one embodiment, the second collar 16 comprises a plurality of fins 17 projecting around the first end 10 of the first cylinder 8.

The external surface 80 of the first cylinder 8 may have a plurality of mutually parallel longitudinal grooves 18. Each of the grooves 18 is positioned in line with each of the fins 17. Each of the grooves 18 is intended to house the fin 17 in line with which a groove 18 is positioned when the fin 17 is bent so that the second collar 16 can pass through the second opening 9 when a user forces the cage device 6 (or the floating-nut system 1) to pass through the second opening 9 parallel to the second axis of revolution A2. FIG. 6 shows a moment in the introduction of the floating-nut system 1 during which the fins are bent into the grooves 18 allowing the cage device 6 to pass through the second opening 9.

Advantageously, the nut device 7 comprises a conical portion 19 secured to the second cylinder 13. The conical portion 19 has the shape of a cone frustum having a small base 21 and a large base 22. The small base 21 connects the conical portion 19 to a first end 20 of the second cylinder 13. The large base 22 is intended to face the first opening 4 when the first cylinder 8 is introduced into the second opening 9. The conical portion 19 enables the free end of the screw 5 to be guided towards the second cylinder 13 so that the screw 5 can be screwed into the screw thread of the second cylinder 13.

The floating-nut system 1 may further comprise a ring 23 having an axis of revolution coincident with the second axis of revolution A2 when the first cylinder 8 is not deformed. The ring 23 is driven into the first cylinder 8. The ring 23 has a thickness D5 substantially intended to be equal to a thickness of the second part 3 liable to be assembled with the first part 2 by the floating-nut system 1. The ring 23 is configured not to deform when the first cylinder 8 deforms. The ring allows the first cylinder 8 to maintain a cylindrical shape at the second opening 9.

The first collar 11 may have a circular rim 24. The first collar 11 may have a cylindrical wall 25 on the circular rim 24. The cylindrical wall 11 has a free end 26 intended to be pressed against the second part 3 when the screw 5 is screwed into the screw thread.

Figure 3:
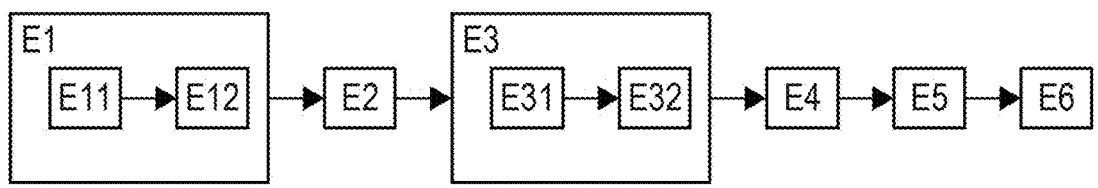
FIG. 3 schematically depicts the method of assembly using the floating-nut system.

The disclosure herein also relates to a method for assembling a first part 2 and a second part 3 using the floating-nut system 1 (FIG. 3).

Figure 4:
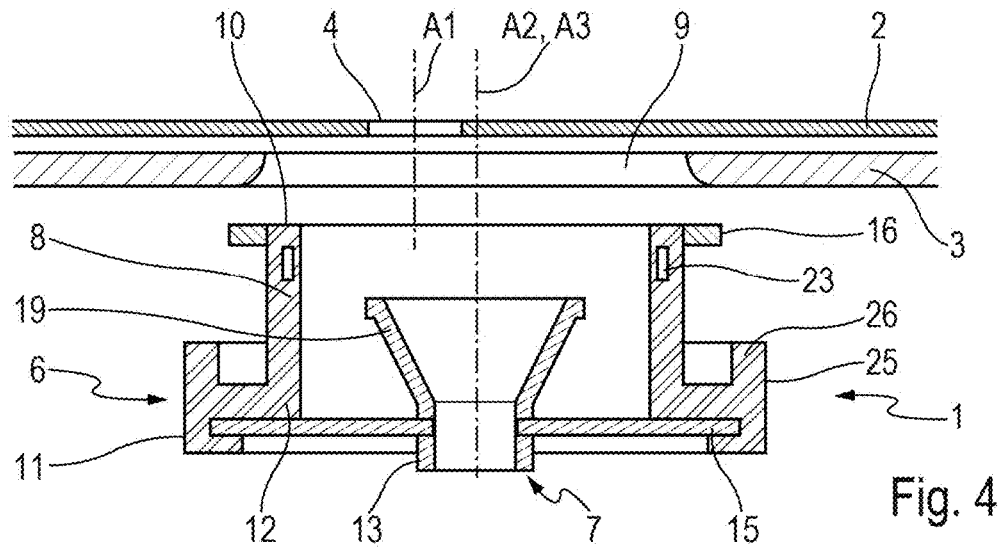
FIG. 4 depicts a diametral cross section through the floating-nut system and through the two parts that are to be assembled prior to the introduction of the first cylinder into the second opening.
Figure 8:
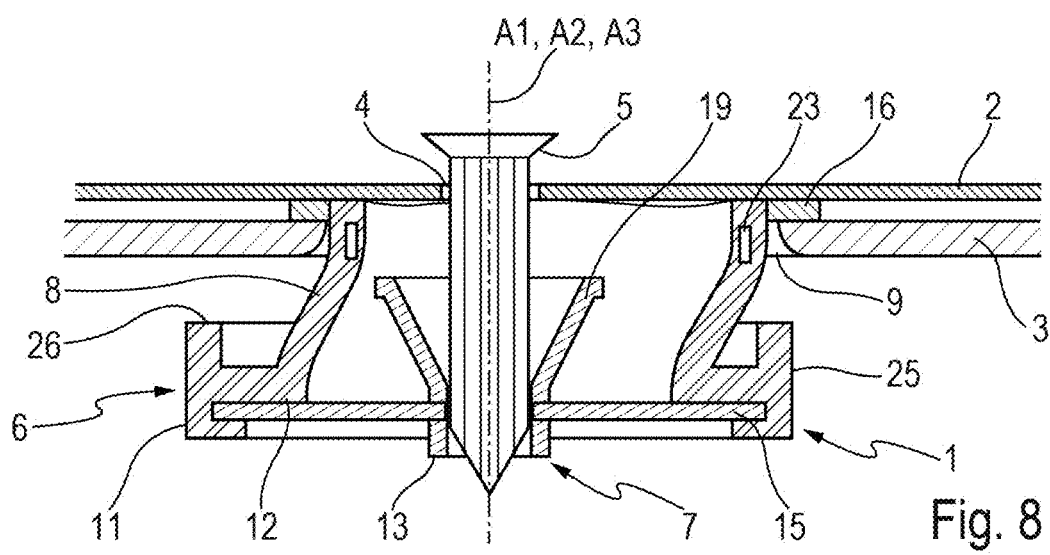
FIG. 8 depicts a diametral cross section through the floating-nut system, through the two parts that are to be assembled, and through the screw at the start of the screwing of the screw into the screw thread of the second cylinder.
Figure 9:
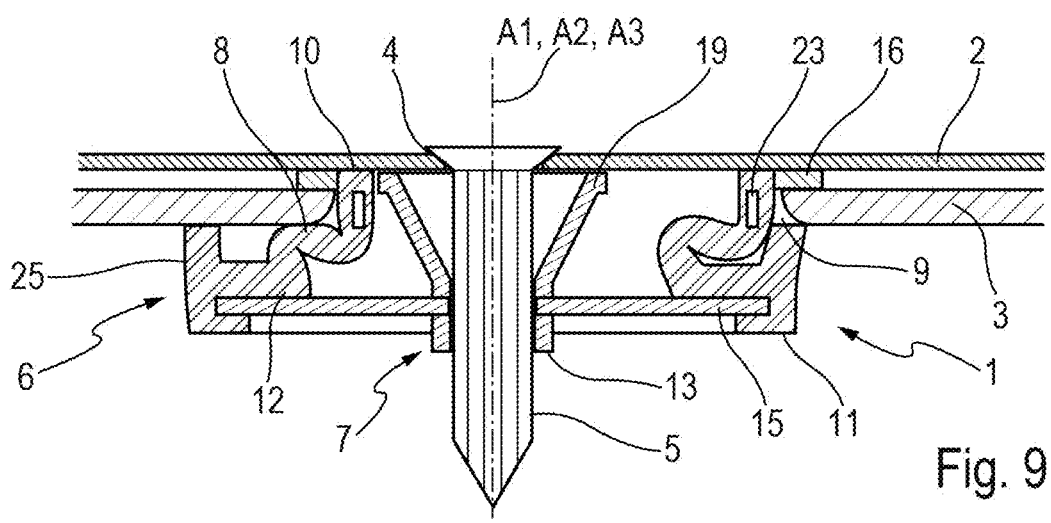
FIG. 9 depicts a diametral cross section through the floating-nut system, through the two parts that are to be assembled, and through the screw once the screw has been fully screwed into the screw thread of the second cylinder.

The method of assembly comprises the following steps:
- a step E1 of introducing the first cylinder 8 into the second opening 9 via the first end 10 of the first cylinder 8 (FIG. 4, FIG. 5 and FIG. 6);
- a step E2 of introducing a screw 5 into the first opening 4 (FIG. 7);
- a first step E3 of deforming the first cylinder 8 in shear until the first axis of revolution A1 and the third axis of revolution A3 of the second cylinder 13 are substantially coincident (FIG. 8);
- a step E4 of introducing the screw 5 into the second cylinder 13 (FIG. 8);
- a step E5 of screwing the screw 5 into the screw thread of the internal surface 14 of the second cylinder 13;
  - a second step E6 of deforming the first cylinder 8 in compression until the washer 15 is pressing the first collar 11 against the second part 3 (FIG. 9).

The step E1 of introducing the first cylinder 8 may comprise:
- a sub-step E11 of bending of the second collar 16 in elastic deformation against the first cylinder 8 as it passes through the second opening 9 (FIG. 5 and FIG. 6);
- a sub-step E12 of unbending of the second collar 16 after the second collar 16 has passed through the second opening 9 (FIG. 7).

The first deformation step E3 may comprise:
- a sub-step E31 of introducing the screw 5 into the conical portion 19 (FIG. 7);
- a sub-step E32 of deforming the first cylinder 8 as the screw 5 progressively enters the conical portion 19 until the screw 5 enters the second cylinder 13 (FIG. 8).

Thus, the first cylinder 8 is liable to deform as a result of two mechanical stresses. The first mechanical stress corresponds to a shear stress. The deformation of the first cylinder 8 brought about by the shear stress makes it possible to contrive for the first axis of revolution A1 of the first cylinder 8 and the third axis of revolution A3 of the second cylinder 13 to become substantially coincident. The shear stress is brought about by the movement of the washer 15 driven by the screw 5. The screw 5 is guided by the conical portion 19 of the nut device 7 towards the second cylinder 13 so as to be able to be screwed into the cylinder. The second mechanical stress corresponds to a uniaxial compressive stress. The deformation of the first cylinder 8 brought about by the uniaxial compressive stress occurs when the screw 5 is screwed into the second cylinder 13 to such a point that the screw 5 is screwed fully in. The uniaxial compressive stress is in a direction parallel to the third axis of revolution A3. The uniaxial compressive stress is therefore applied by the washer 15. When the screw 5 is screwed into the second cylinder 13, the screw 5 pulls the washer 15 towards the second part 3. The washer 15 thus applies a compressive stress to the first cylinder 8.

The floating-nut system 1 affords numerous advantages:
- its mass is reduced in comparison with that of the floating nuts of the prior art;
- it enables a reduction in factory assembly time;
- it can be used in instances requiring a small or large degree of float, which is to say that it can be used in instances in which the misalignment between the two parts that are to be assembled is small or large;
- it can be used in a wide range of configurations, for example in the ventral fairing of an aircraft, an aircraft cabin, etc.;
- it is highly repairable in that it is quick and easy to replace if need be;
- it offers isostatism, providing filtering of the vibrations exerted by the assembled parts; and
- it avoids the problems of galvanic corrosion.

While at least one example embodiment of the invention(s) is disclosed herein, it should be understood that modifications, substitutions, and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A floating-nut system assembling a first part and a second part, the first part comprising a first opening that is configured for passage of a screw and has a first axis of revolution and the second part comprising a second opening, the system comprising:
- at least one elastomer cage device comprising:
- a first cylinder that is hollow and has a second axis of revolution and an outside diameter substantially equal to a diameter of the second opening, the first cylinder being configured to be introduced into the second opening via a first end of the first cylinder;
- a first collar projecting around a second end of the first cylinder on an external surface of the first cylinder, the first collar having a diameter greater than a diameter of the second opening; and
- a second collar projecting around the first end of the first cylinder on an external surface of the first cylinder, wherein the second collar:
- has a diameter greater than the diameter of the second opening;
- is elastically deformable so that the second collar is configured to bend against the first cylinder in order to pass through the second opening when a user forces the cage device to pass through the second opening in a direction parallel to the second axis of revolution; and
- is configured to return to an unbent state after having passed through the second opening; and
- a nut device comprising:
- a second cylinder that is hollow and has a third axis of revolution, which is parallel to the second axis of revolution, and an internal surface comprising a screw thread, the screw thread being configured to collaborate with the screw as the screw is screwed in; and
- a washer secured to the second cylinder, wherein the washer extends entirely around the second cylinder, has a diameter greater than the diameter of the second opening, is embedded in the first collar, and is configured to press the first collar against the second part when the screw is screwed into the screw thread;
- wherein the first cylinder is deformable as the screw is screwed in, so that the first axis of revolution and the third axis of revolution become substantially coincident with each other when a screw is screwed into the screw thread.

2. The system according to claim 1, wherein the second collar is configured to be clamped between the first part and the second part when the screw is screwed into the screw thread.

3. The system according to claim 2, wherein the second collar comprises a plurality of fins projecting around the first end of the first cylinder.

4. The system according to claim 3, wherein:
- the external surface of the first cylinder has a plurality of grooves that extend longitudinally and mutually parallel to each other;
- each groove of the plurality of grooves is positioned axially in line with a corresponding fin of the plurality of fins; and
- each groove of the plurality of grooves is configured to house the corresponding fin that is axially in line with the groove when the corresponding fin is bent while the second collar passes through the second opening when the user forces the cage device to pass through the second opening, in the direction parallel to the second axis of revolution.

5. The system according to claim 1, wherein:
- the nut device comprises a conical portion secured to the second cylinder;

the conical portion has a shape of a cone frustum, with a small base, which connects the conical portion to a first end of the second cylinder, and a large base, which is configured to face the first opening.

6. The system according to claim 1, comprising a ring having an axis of revolution coincident with the second axis of revolution, wherein:
- the ring is driven into the first cylinder;
- the ring has a thickness substantially equal to a thickness of the second part that can be assembled with the first part by the floating-nut system; and
- the ring is configured not to deform when the first cylinder deforms.

7. The system according to claim 6, wherein, by not bending when the first cylinder deforms, the ring maintains the first cylinder in a cylindrical shape at the second opening.

8. The system according to claim 6, wherein the ring is positioned along a length of the first collar such that, when the first part is assembled with the second part by the floating-nut system, the ring is coplanar with the second part.

9. The system according to claim 1, wherein:
- the first collar has a circular rim;
- the first collar has a cylindrical wall on the circular rim; and
- the cylindrical wall has a free end configured for pressing against the second part when the screw is screwed into the screw thread.

10. A method for assembling a first part and a second part using the floating-nut system according to claim 1 and a screw, the method comprising:
- introducing the first cylinder into the second opening via the first end of the first cylinder;
- introducing the screw into the first opening;
- deforming the first cylinder in shear until the first axis of revolution and the third axis of revolution of the second cylinder are substantially coincident;
- introducing the screw into the second cylinder;
- screwing the screw into the screw thread of the internal surface of the second cylinder; and
- deforming the first cylinder in compression until the washer is pressing the first collar against the second part.

11. The method according to claim 10, wherein introducing the first cylinder into the second opening comprises:
- bending the second collar in elastic deformation against the first cylinder as the second collar passes through the second opening; and
- unbending the second collar after the second collar has passed through the second opening.

12. The method according to claim 10, wherein:
- the nut device comprises a conical portion secured to the second cylinder; and
- deforming the first cylinder in shear until the first axis of revolution and the third axis of revolution of the second cylinder are substantially coincident comprises:
  - introducing the screw into the conical portion; and
  - deforming the first cylinder as the screw progressively enters the conical portion until the screw enters the second cylinder.

13. An assembly comprising:
- a first part comprising a first opening having a first axis of rotation;
- a second part comprising a second opening;

a screw that is inserted into and through the first opening and the second opening; and a floating-nut system assembling the first part with the second part using the screw, the system comprising:

at least one elastomer cage device comprising:

a first cylinder that is hollow and has a second axis of revolution and an outside diameter substantially equal to a diameter of the second opening, wherein the first cylinder is introduced into the second opening via a first end of the first cylinder;

a first collar projecting around a second end of the first cylinder on an external surface of the first cylinder, the first collar having a diameter greater than a diameter of the second opening; and a second collar projecting around the first end of the first cylinder on an external surface of the first cylinder, wherein the second collar:

has a diameter greater than the diameter of the second opening;

is elastically deformable so that the second collar is configured to bend against the first cylinder in order to pass through the second opening when a user forces the cage device to pass through the second opening in a direction parallel to the second axis of revolution; and is configured to return to an unbent state after having passed through the second opening; and a nut device comprising:

a second cylinder that is hollow and has a third axis of revolution, which is parallel to the second axis of revolution, and an internal surface comprising a screw thread, with which the screw engages as the screw is screwed in; and a washer secured to the second cylinder, wherein the washer extends entirely around the second cylinder, has a diameter greater than the diameter of the second opening, is embedded in the first collar, and is presses the first collar against the second part when the screw is screwed into the screw thread;

wherein the first cylinder is deformable as the screw is screwed in, so that the first axis of revolution and the third axis of revolution become substantially coincident with each other when a screw is screwed into the screw thread.

14. The assembly according to claim 13, wherein the second collar is clamped between the first part and the second part when the screw is screwed into the screw thread.

15. The system according to claim 14, wherein the second collar comprises a plurality of fins projecting around the first end of the first cylinder.

16. The system according to claim 15, wherein:

the external surface of the first cylinder has a plurality of grooves that extend longitudinally and mutually parallel to each other;

each groove of the plurality of grooves is positioned axially in line with a corresponding fin of the plurality of fins; and each groove of the plurality of grooves is configured to house the corresponding fin that is axially in line with the groove when the corresponding fin is bent while the second collar passes through the second opening when the user forces the cage device to pass through the second opening, in the direction parallel to the second axis of revolution.

17. The system according to claim 13, wherein:

the nut device comprises a conical portion secured to the second cylinder;

the conical portion has a shape of a cone frustum, with a small base, which connects the conical portion to a first end of the second cylinder, and a large base, which is configured to face the first opening.

18. The system according to claim 13, comprising a ring having an axis of revolution coincident with the second axis of revolution, wherein:

the ring is driven into the first cylinder;

the ring has a thickness substantially equal to a thickness of the second part that can be assembled with the first part by the floating-nut system; and the ring is configured not to deform when the first cylinder deforms.

19. The assembly according to claim 18, wherein:

by not bending when the first cylinder deforms, the ring maintains the first cylinder in a cylindrical shape at the second opening; and/or the ring is positioned along a length of the first collar such that, when the first part is assembled with the second part by the floating-nut system, the ring is coplanar with the second part.

20. The system according to claim 13, wherein:

the first collar has a circular rim;

the first collar has a cylindrical wall on the circular rim; and the cylindrical wall has a free end configured for pressing against the second part when the screw is screwed into the screw thread.

* * * * *